United States Patent [19]

Kruse

[11] 4,244,741

[45] Jan. 13, 1981

[54] INFRARED ABSORBER

[75] Inventor: Jurgen M. Kruse, Acton, Mass.

[73] Assignee: United States Postal Service, Washington, D.C.

[21] Appl. No.: 8,635

[22] Filed: Mar. 16, 1979

[51] Int. Cl.$^3$ .................... C09D 11/00; C09D 5/32
[52] U.S. Cl. ........................................ 106/20; 106/19; 106/177; 106/287.18; 252/300; 260/42; 525/2; 525/4
[58] Field of Search .................... 260/29.6 MM, 42; 106/20, 19, 177, 196, 287.18; 252/300; 525/2, 4

[56] References Cited

U.S. PATENT DOCUMENTS

| | | | |
|---|---|---|---|
| 1,441,664 | 1/1923 | Cross | 106/20 |
| 2,377,593 | 6/1945 | Vande Bunte | 106/20 X |
| 2,813,802 | 11/1957 | Ingle et al. | 117/33.3 |
| 2,971,921 | 2/1961 | Coleman et al. | 252/300 |
| 3,000,833 | 9/1961 | Coleman et al. | 252/300 |
| 3,291,746 | 12/1966 | Donoian et al. | 252/300 |
| 3,440,257 | 4/1969 | Susi et al. | 260/440 |
| 3,713,880 | 1/1973 | Krekeler | 117/138.8 B |
| 3,870,528 | 3/1975 | Edds et al. | 106/22 |

OTHER PUBLICATIONS

Prado et al., "reparing Soln's of Reduced Phosphomolybdic Acid", Chemical Abstracts 78, 143541y, (1973).
Miqunova, "Variation of Molybdosilicic Acid with Time", Chemical Abstracts 84, 9520m, (1976).

*Primary Examiner*—Earl A. Nielsen
*Attorney, Agent, or Firm*—Theodore Major

[57] ABSTRACT

This document discloses the use of reduced heteropoly acids as additives to absorbing material to impart reduced infrared reflectivity or transmission thereto. The reduced infrared reflectivity is especially suitable for use in inks for reading bar coded and optical character reader mail by a special sensing device wherein the infrared portion of the spectrum is betwen about 700 and 1000 nanometers. It is also useful in plastics, aqueous solutions, photographic screens, and paints.

19 Claims, No Drawings

INFRARED ABSORBER

BACKGROUND OF THE INVENTION

This invention relates to the discovery that certain heteropoly acids are useful to import reduced infrared reflectivity or transmission in absorbing materials. This invention also relates to certain complexes which are especially useful for this purpose. It especially relates to reduced infrared reflectivity of inks.

DESCRIPTION OF THE PRIOR ART

U.S. Pat. Nos. 2,813,802; 3,000,833 and 3,870,528 illustrate infrared filter media, color salts of fluorenols as infrared absorbers, and infrared and visible dual dye jet printer ink respectively. Other U.S. Pat. Nos., namely, 2,971,921; 3,440,257 and 3,291,746 also illustrate infrared absorbers for various materials. Moreover, U.S. Pat. No. 3,870,528 also illustrates an infrared absorber also utilized in conjunction with ink whereby the ultimate character is read by an otpical character reader.

OBJECTS OF THE INVENTION

The object of this invention is to provide an improved infrared absorber system. Another object of this invention is to provide an improved ink system. A further object of the invention is to provide ink reflectivities in the infrared lower than about thirty (30) percent. A still further object of the invention is to provide an improved ink system for use in an infrared reader wherein bar half bar printing is used. Another object of the invention is to provide an improved ink system for use in an infrared reader wherein an optical character reader is used. Other objects, features and advantages of the invention will be apparent from the following more particular description of embodiments of the invention.

SUMMARY OF THE INVENTION

The invention provides an improved infrared absorber system. The invention further provides an improved ink system for use with flexographic ink. The invention also specifically discloses heteropolyacids in a solvent wherein a pH is maintained at about 1, that such an additive imparts reduced infrared reflectivity and transmission in flexographic inks.

DETAILED DESCRIPTION OF THE INVENTION

EXAMPLE I

This example illustrates stability of prints prepared from five flexographic inks, namely, purple, blue, green, yellow and red. The overall composition is utilized in the following ratios, wherein (C)=heteropolyacid complex, and S=solvent:

| | |
|---|---|
| (a) | 1 ml. complex (C): 1 ml. solvent (S): 1 ml. ink (1:1:1) |
| (b) | 1 ml. complex (C): 2 ml. solvent (S): 2 ml. ink (1:2:2) |
| (c) | 1 ml. complex (C): 2 ml. solvent (S): 1 ml. ink (1:2:1) |

The stability of the prints was studied by measuring the change of reflectance that results from ageing in the dark and in sunlight, using a Cary spectro-photometer, model 171. The spectra were taken between 600 and 1000 NM; the minimum reflectance is at 790 NM in all cases. Eight spectra were taken on each print in a period of six (6) weeks at intervals of approximately one (1) week between runs. The prints were exposed to sunlight by attaching them to a glass window. The samples tested for ageing in the dark remained in closed drawers except for the times when they were taken out for reflectance readings. A solubility difference is noted between the three solutions described for each ink. The best solubility is obtained in the solution prepared in the proportion 1:2:1. The increase in the amount of solvent increases the solubility of the mixture. Regardless of the proportions of C, S and ink, the solubility of the ink decreases in the following order: purple > green > red ≈ blue ≫ yellow. The yellow prints were not analyzed because of solubility problems.

The inks were applied to paper with an Anilox roller, and the infrared reflectivities measured with a P & DS Contrast Meter. The reflectivity of C plus S ink and without pH control of C is shown in Table 1.

TABLE I

| pH of C | ml C | ml S | ml ink | ink color | IR refl., % |
|---|---|---|---|---|---|
| — | 0 | 0 | 1 | purple | 79–83 |
| — | 0 | 0 | 1 | blue | 63–65 |
| — | 0 | 0 | 1 | green | 76–82 |
| — | 0 | 0 | 1 | yellow | 81–85 |
| — | 0 | 0 | 1 | red | 80–83 |
| 1.0 | 1 | 0 | 0 | — | 10–13 |
| 1.0 | 1 | 1 | 0 | — | 27–34 |
| 1.0 | 1 | 2 | 0 | — | 15–20 |
| 1.0 | 1 | 3 | 0 | — | 15–17 |
| 1.0 | 1 | 1 | 1 | purple | 10–13 |
| 1.0 | 1 | 1 | 1 | blue | 11–14 |
| 1.0 | 1 | 2 | 1 | purple | 24–28 |
| 1.0 | 1 | 2 | 1 | blue | 23–28 |
| 1.0 | 1 | 2* | 1 | green | 27–31 |
| 1.0 | 1 | 4* | 1 | yellow | 21–24 |
| 1.0 | 1 | 4* | 1 | red | 31–34 |
| 1.5 | 1 | 2 | 1 | purple | 53–56 |
| 1.5 | 1 | 2 | 1 | blue | 38–45 |

*Minimum amount of solvent required to give complete miscibility.

Table II illustrates the effect of sunlight exposure on prints of proportion 1:1:1.

TABLE II

| | Reflectance at 790 nm, % | |
|---|---|---|
| Proportion | Purple | Blue |
| 1:1:1 | 11.5 | 10.5 |
| " | 12.0 | 11.0 |
| " | 12.0 | 12.0 |
| " | 13.5 | 12.0 |
| " | 17.0 | 15.0 |
| " | 18.0 | 15.0 |
| " | 17.0 | 14.0 |
| " | 18.0 | 15.0 |

Table III illustrates the effect of sunlight exposure on prints on proportion 1:2:2.

TABLE III

| | | Reflectance at 790 nm, % | | |
|---|---|---|---|---|
| Time | Proportion | Purple | Blue | Green |
| Start | 1:2:2 | 24.5 | 19.5 | 16.0 |
| 1 day | " | 29.5 | 22.0 | 17.5 |
| 1 week | " | 32.0 | 24.0 | 18.5 |
| 2 weeks | 1:2:2 | 35.0 | 26.5 | 21.0 |
| 3 weeks | " | 41.0 | 32.0 | 27.0 |
| 4 weeks | " | 42.0 | 32.0 | 26.5 |
| 5 weeks | " | 44.0 | 32.0 | 29.0 |
| 6 weeks | " | 45.0 | 32.0 | 26.5 |

EXAMPLE II

This example illustrates one method for preparing reduced phosphomolybdic acid (RPMA) utilized in the invention.

A sample of reduced phosphomolybdic acid (RPMA) is prepared by mixing a solution of 20 g phosphomolybdic acid in 50 ml of 2% $H_2SO_4$ with a solution of 5 g ascorbic acid in 25 ml of water. The mixed solution is evaporated by gently heating in a stream of air to give a pasty solid containing about 20% water. This solid is mixed with a standard purple flexographic ink by shaking on a vibrating mill for the times shown. The modified ink is tested by measurements of hand drawdowns on white paper.

| Sample | Mg Ink | Mg RPMA | Time of Mixing | Infrared Reflectivity on PCM |
|---|---|---|---|---|
| 1 | 500 | 0 | 0 | 79 |
| 2 | 500 | 5 | 120 sec | 50 |
| 3 | 580 | 48 | 120 sec | 37 |
| 4 | 895 | 120 | 180 sec | 17-21 |

EXAMPLE III

This example illustrates another method for preparing reduced phosphomolybdic acid (RPMA) utilized in the invention. The resulting product in this example is a plastic lens having high absorption in the ultraviolet and near infrared with good transmission in the visible (0.4 to 0.7 nm) region of the electromagnetic spectrum.

A semiaqueous alcohol solution of reduced phosphomolybdic acid (RPMA) or other heteropolyacid is prepared by dissolving 10 g PMA in 25 ml of 2% sulfuric acid, adding a solution of 2 g ascorbid acid in 10 ml of water, and then 70 ml of isopropanol. One milliliter of this solution is added to 100 ml of a solution of siloxane (i.e. as described in U.S. Pat. No. 3,713,880) prior to use of the siloxane for coating. However, the concentrations may be adjusted to higher or lower levels depending on the level of infrared protection desired.

The RPMA complex is formed by mixing 20 g PMA in 50 ml of 2% sulfuric acid with 5 g ascorbid acid in 25 ml of water. Water is stripped from this solution until most of the RPMA has precipitated. The precipitated RPMA is ground to a fine powder, and milled into plastics such as cellulose acetate at a level of 0.002 parts RPMA per 100 parts of plastic. The plastic is then molded into the desired shape to give a material lens having high absorption in the ultraviolet and near infrared with good transmission in the visible (0.4 to 0.7 $\mu$m) region of the electromagnetic spectrum.

A similar procedure is employed to prepare samples of RPMA in other plastics such as polyethylene or polyvinyl chloride.

EXAMPLE IV

This example illustrates another method for using RPMA with a final concentration of 0.005% to significantly increase the sorption of solar energy.

A solution of RPMA in water prepared as in prior examples is added to an aqueous solution to give a final concentration of 0.005%. This solution is designed to absorb radiant solar energy outside the visible spectrum, i.e. 0.3 to 0.4 and 0.7-1.3. The approximate distribution of radiant energy of sunlight is shown as follows:

|  | % of Total |
|---|---|
| 0.3-0.4$\mu$ | 5 |
| 0.4-0.7$\mu$ | 42 |
| 0.7-1.0$\mu$ | 23 |
| 1.0-1.3$\mu$ | 12 |
| 1.3-1.6$\mu$ | 4.5 |
| 1.6-2.7$\mu$ | 9.5 |
| >2.7 $\mu$ | 4 |

The RPMA thus can serve as an adjunct to a constituent sorbing in the 0.4 to 0.7$\mu$ region of the spectrum to significantly increase the sorption of solar radiant energy.

EXAMPLE V

This example shows another method for preparing RPMA and comparison of infrared reflectivity with RPMA and flexographic ink and unmodified flexographic ink.

Twenty g of phosphomolybdic acid are dissolved in 50 ml of 2% sulfuric acid. To this solution is added a solution of 5 g ascorbic acid in 25 ml of water, and the pH of the resultant mixed solution adjusted to 1.0. To this mixed solution then is added 75 ml of ethyleneglycol mono-methylether. This solution, which is called C hereafter, is mixed with 75 ml of the flexographic ink and a hand drawdown prepared. The infrared reflectivities, as measured at 790 nm, are compared with the infrared reflectivites of drawdowns of the unmodified flexographic inks with the following results:

|  | Infrared Reflectivity 790 |
|---|---|
| Unmodified purple ink | 79-83% |
| Unmodified blue ink | 63-65% |
| Unmodified green ink | 76-82% |
| Unmodified red ink | 80-83% |
| Purple ink with RPMA | 10-13% |
| Blue ink with RPMA | 11-14% |
| Green ink with RPMA | 27-31% |
| Red ink with RPMA | 39-45% |

EXAMPLE VI

The procedure of Example V is followed, except that 0.5 g of sodium lauryl sulfate is added to the sulfuric acid solution to facilitate the subsequent mixing with ink.

EXAMPLE VII

The procedure of Example V was followed except that two parts of ink are mixed with 1 part RPMA solution (pH 1.0) and 1 part ethylene glycol mono ethyl ether. Hand drawdowns had the following infrared reflectivities:
Green 30-32%
Red 39-45%
Blue 25-29%

EXAMPLE VIII

The heteropoly acid can be obtained commercially or prepared by any of the commonly known methods. For example, those described by Boltz & Mellon—Boltz, D., and Mellon, M., Anal. Chem. 19, 873 (1947) and Rosenheim, A., and Kohn, F., Z. anorg, Chem. 69, 247 (1911).

This example illustrates use of commercial acid with the resultant reflectivities of the acid modified and unmodified inks.

As example, 20 g of commercial phosphomolybdic acid are dissolved in 50 ml of 2% sulfuric acid. To this solution is added a solution of 5 g ascorbic acid in 25 ml of water and the two solutions mixed. One part of this mixture is then mixed with 1 part of ethylene glycol monoethyl ether and 2 parts of ink to give an ink having an infrared reflectivity of 26%. Thus to 20 g phosphomolybdic acid in 50 ml of 2% sulfuric acid is added 0.5 g sodium lauryl sulfate, the solution is reduced by addition of 5 g ascorbic acid in 25 ml of water, and the pH adjusted to 1.0 with sulfuric acid. To one part of this solution is added 1 part of methyl cellosolve and 1 part of purple or blue ink to formulate inks which were then applied to paper with an Anilox hand roller. The resultant drawdowns had infrared reflectivities of 10–13% and 11–14%, respectively, while the unmodified inks had given reflectivities of 80 and 64%, respectively.

The optimum pH of the aqueous solution of the reduced heteropoly acids prior to addition of the glycol ether and ink is between 0.5 and 1.0. At higher pH values the stability and the infrared reflectivities of the printed ink decrease, while lower pH values introduce corrosion problems.

Other uses of these reduced heteropolyacids would be as heat screens which transmit visible light in protective glass or plastics, photographic screens and solar plastics used as screens.

While the invention has been particularly described with reference to preferred embodiments thereof, it will be understood by those skilled in the art that various changes and modifications may be made therein without departing from the spirit and scope of the claimed invention.

I claim:

1. An infrared absorbing composition comprising an absorbing layer material, a reduced heteropolyacid selected from the group consisting of phosphomolybdic acid, phosphotungstic acid, silicomolybdic acid and silicotungstic acid and a solvent selected from the group consisting of water, alcohol and a glycol ether.

2. An infrared absorbing composition of matter in accordance with claim 1 wherein said absorbing layer material is selected from the group consisting of flexographic inks, plastics, aqueous solutions, and paints.

3. An infrared absorbing ink composition of matter consisting of reduced heteropolyacids selected from the group consisting of phosphomolybdic acid, phosphotungstic acid, silicomolybdic acid and silicotungstic acid; a flexographic ink, and a solvent selected from the group consisting of water, alcohols and glycol ethers.

4. An infrared absorbing ink composition of matter in accordance with claim 3 wherein said herteropolyacid is phosphomolybdic acid.

5. An infrared absorbing ink composition of matter in accordance with claim 3 wherein said heteropolyacid is phosphotungstic acid.

6. An infrared absorbing ink composition of matter in accordance with claim 3 wherein said heteropolyacid is silicomolybdic acid.

7. An infrared absorbing ink composition of matter in accordance with claim 3 wherein said heteropolyacid is silicotungstic acid.

8. An infrared ink composition of matter in accordance with claim 3 wherein said solvent is water.

9. An infrared absorbing ink composition of matter in accordance with claim 3 wherein said solvent is an alcohol.

10. An infrared absorbing ink composition of matter in accordance with claim 3 wherein said solvent is a glycol ether.

11. A method of reducing infrared reflectivity in a flexographic ink which comprises incorporating therein a heteropolyacid selected from the group consisting of phosphomolybdic acid, phosphotungstic acid, silicomolybdic acid and silicotungstic acid in a solvent selected from the group consisting of water, an alcohol and a glycol ether to which acid a reducing agent has been added.

12. A method of reducing infrared reflectivity in a flexographic ink in accordance with claim 11 wherein said reducing agent is ascorbic acid.

13. A method of reducing reflectivity in a flexographic ink in accordance with claim 11 wherein said heteropolyacid is phosphomolybdic acid.

14. A method of reducing infrared reflectivity in a flexographic ink in accordance with claim 11 wherein said heteropolyacid is phosphotungstic acid.

15. A method of reducing infrared reflectivity in a flexographic ink in accordance with claim 11 wherein said heteropolyacid is silicomolybdic acid.

16. A method of reducing infrared reflectivity in a flexographic ink in accordance with claim 11 wherein said heteropolyacid is silicotungstic acid.

17. A method of reducing infrared reflectivity in a flexographic ink in accordance with claim 11 wherein said solvent is water.

18. A method of reducing infrared reflectivity in a flexographic ink in accordance with claim 11 wherein said solvent is an alcohol.

19. A method of reducing infrared reflectivity in a flexographic ink in accordance with claim 11 wherein said solvent is a glycol ether.

* * * * *